M. B. RYAN.
CHAIN LINK.
APPLICATION FILED DEC. 11, 1917.

1,407,043.

Patented Feb. 21, 1922.

INVENTOR
Michael B. Ryan,
BY
Prindle, Wright & Small,
ATTORNEYS

UNITED STATES PATENT OFFICE.

MICHAEL B. RYAN, OF MILFORD, CONNECTICUT.

CHAIN LINK.

1,407,043.

Specification of Letters Patent.  Patented Feb. 21, 1922.

Application filed December 11, 1917. Serial No. 206,696.

*To all whom it may concern:*

Be it known that I, MICHAEL B. RYAN, of Milford, in the county of New Haven and in the State of Connecticut, have invented a certain new and useful Improvement in Chain Links, and do hereby declare that the following is a full, clear, and exact description thereof.

My invention relates to chain links, and has for an object to produce such a link which shall be of strong and durable construction without requiring the use of an undue amount of material, or awkward operations in making it.

Another object of my invention is to provide such a link in which the ends of the blank are adapted to be welded, in which the weld is of comparatively large area, and not subjected to strains which would break the chain at that point.

A further object of my invention is to utilize the welded portions to reinforce the link in such a manner as to prevent its collapse, or distortion from proper shape.

Other objects and advantages of my invention will be in part obvious and in part specifically mentioned hereinafter.

Figure 1:
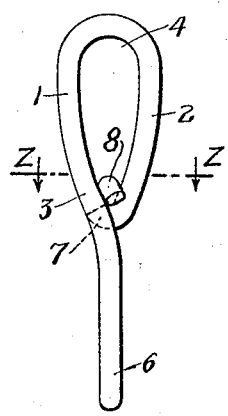
Figure 2:
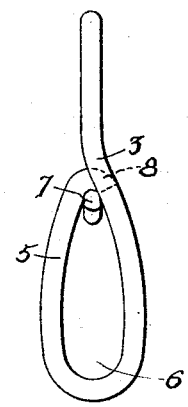
Figure 3:
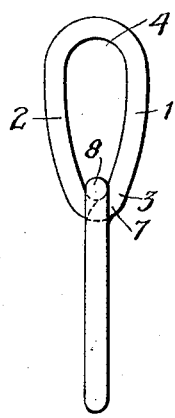
Figure 4:
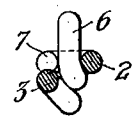

In the drawings, in which I have shown an embodiment of my invention which is to be considered as merely illustrative of its principle, Fig. 1 is a front elevation of the link, Fig. 2 is a view of the link as seen from the left of Fig. 1, Fig. 3 is a rear elevation of the link as seen in Fig. 1; and Fig. 4 is a section on line z—z, Fig. 1.

In forming the link I use a strand of wire 1, ordinarily circular wire rod, which has previously been cut to a length necessary to produce the desired size of link. An end portion 2 of the strand 1 is doubled or bent back upon the intermediate part 3 thereof to form an eye 4, and the remaining end portion 5 is similarly doubled back upon the intermediate part of the strand, 3, to form a second eye 6. In the illustrated form, these eyes are located in planes at right angles to each other.

The end 2 of the strand is extended to project into the eye 6 by means of a hook 7, and the end 5 of the strand is provided with a similar hook 8 which projects into the eye 4, thus interlocking with the hook 7, previously described. The hooks 7 and 8 are then welded both to each other and to the intermediate part of the strand, 3.

With the link made in this manner, it will be noted that the welded portions of the link do not lie along the line of strain so as to subject the weld to shearing strains; the hooks 7 and 8 are interlocked in such a way that the weld is subjected only to compression, a strain which will not tend to break the chain at the point of the weld.

Each hook also acts as a wedge within the eye formed by the opposite end of the strand, so that each eye is reinforced by a hook in such a way as to resist any tendency of the eye to collapse or distort when the link is under tension.

The hooks 7 and 8 together with the intermediate part of the strand, 3, further provide a large welding surface, with the result that the ends of the strand are securely held in place.

As the welded ends of the strand are interlocked with each other, and as each end is used to reinforce the eye formed by the opposite end of the strand, and as large welding surfaces are provided and are so located as not to be subject to undue strain, it will be apparent that the whole link is so made as not to be readily broken or distorted in use.

I claim:

1. A chain link comprising a strand of wire having one end doubled back to form an eye, said end being bent over a fraction of a turn to form a hook with its end lying along the intermediate portion of the strand, the other end being similarly doubled back and bent over a fraction of a turn to form a second eye and to form a hook extending into the eye formed by said first-mentioned hook and interlocking with said first-mentioned hook, and also having its end lying along the intermediate portion of the strand.

2. A chain link comprising a strand of wire having one end doubled back to form an eye, said end being bent over a fraction of a turn to form a hook with its end lying along the intermediate portion of the strand, the other end being similarly doubled back and bent over a fraction of a turn to form a second eye and to form a hook extending into the eye formed by said first-mentioned hook and interlocking with said first-mentioned hook and also having its end lying along the intermediate portion of the strand, said hooks being welded together and to the intermediate portion of the strand.

3. A chain link comprising a strand of wire having its ends bent over a fraction of a turn to form hooks in planes at right angles to each other and interlocking, the end of each of said hooks lying along the intermediate portion of the strand, such hooks being welded together and to the intermediate portion of the strand.

In testimony that I claim the foregoing I have hereunto set my hand.

MICHAEL B. RYAN.

Witness:
EDWIN J. PRINDLE.